United States Patent
Saviainen et al.

(10) Patent No.: US 9,624,442 B2
(45) Date of Patent: Apr. 18, 2017

(54) METHOD OF UTILIZING TALL OIL PITCH

(75) Inventors: Juhani Saviainen, Rauma (FI); Mikko Rintola, Rauma (FI); Timo Saarenko, Rauma (FI)

(73) Assignee: FORCHEM OYJ, Rauma (FI)

( * ) Notice: Subject to any disclaimer, the term of this patent is extended or adjusted under 35 U.S.C. 154(b) by 1023 days.

(21) Appl. No.: 13/637,002

(22) PCT Filed: Mar. 28, 2011

(86) PCT No.: PCT/FI2011/050256
§ 371 (c)(1),
(2), (4) Date: Oct. 22, 2012

(87) PCT Pub. No.: WO2011/117474
PCT Pub. Date: Sep. 29, 2011

(65) Prior Publication Data
US 2013/0041192 A1 Feb. 14, 2013

(30) Foreign Application Priority Data
Mar. 26, 2010 (FI) .................... 20105308

(51) Int. Cl.
*C10L 1/04* (2006.01)
*C10G 3/00* (2006.01)
(Continued)

(52) U.S. Cl.
CPC ............. *C10G 3/50* (2013.01); *C10L 1/026* (2013.01); *C10L 1/08* (2013.01); *C11B 13/005* (2013.01);
(Continued)

(58) Field of Classification Search
CPC ...... Y02W 30/74; Y02E 50/13; C11B 13/005; C11C 1/04; C11C 3/003; C10G 2400/04;
(Continued)

(56) References Cited

U.S. PATENT DOCUMENTS

| 4,524,024 A | * | 6/1985 | Hughes | C11C 1/04 530/205 |
| 2005/0010061 A1 | * | 1/2005 | Hamunen | C07J 9/00 552/540 |

(Continued)

FOREIGN PATENT DOCUMENTS

EP 1291355 A1 3/2003
FI 118007 B1 5/2007
(Continued)

OTHER PUBLICATIONS

Glover, W.B. "Selecting Evaporators for Process Applications", Chemical Engineering Progress (Dec. 2004), pp. 26-33 (Available online at http://www.lcicorp.com/assets/documents/CE_Evap_Selection.pdf).*

Coll, Robert et al., "Conversion of the Rosin Acid Fraction of Crude Tall Oil Into Fuels and Chemicals,"Energy & Fuels 2001, pp. 1166-1172.

*Primary Examiner* — In Suk Bullock
*Assistant Examiner* — Aaron Pierpont
(74) *Attorney, Agent, or Firm* — Birch, Stewart, Kolasch & Birch, LLP

(57) ABSTRACT

A method of treating tall oil pitch. In the present method, part of the fatty acids and the resin acids are released from their sterol esters and wood alcohol esters and converted into methanol esters or ethanol esters. The transesterified products are removed from the pitch by evaporation and then condensed, and by hydrogenating the generated condensate the acids are decarboxylated and the double bonds are satisfied. It is possible to use the present method to produce automotive fuel from tall oil pitch.

17 Claims, 1 Drawing Sheet

(51) Int. Cl.
*C10L 1/02* (2006.01)
*C11B 13/00* (2006.01)
*C11C 1/04* (2006.01)
*C11C 3/00* (2006.01)
*C10L 1/08* (2006.01)

(52) U.S. Cl.
CPC ............... *C11C 1/04* (2013.01); *C11C 3/003* (2013.01); *C10G 2300/1014* (2013.01); *C10G 2400/04* (2013.01); *Y02E 50/13* (2013.01); *Y02P 30/20* (2015.11); *Y02W 30/74* (2015.05)

(58) Field of Classification Search
CPC ... C10G 3/50; C10G 2300/1014; C10L 1/026; C10L 1/08; C07C 7/04
USPC .......................................... 585/16, 254, 800
See application file for complete search history.

(56) References Cited

U.S. PATENT DOCUMENTS

2008/0163543 A1* 7/2008 Abhari ............... C10G 45/60
44/308
2009/0056201 A1 3/2009 Morgan

FOREIGN PATENT DOCUMENTS

| WO | WO-2008006190 A1 | 1/2008 |
| WO | WO-2008099051 A3 | 10/2008 |
| WO | WO 2009/029344 A1 | 3/2009 |
| WO | WO-2009011639 A3 | 4/2009 |

\* cited by examiner

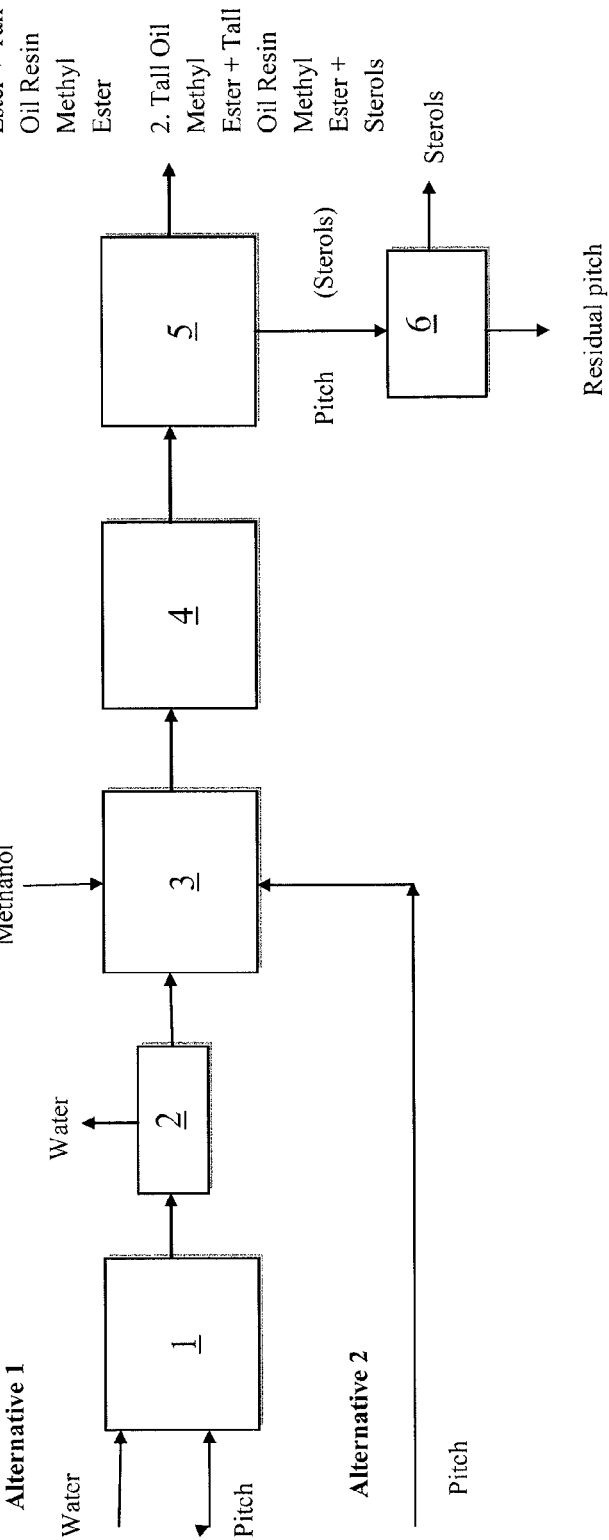

METHOD OF UTILIZING TALL OIL PITCH

This application is the National Phase Under 35 U.S.C. § 371 of PCT International Application No. PCT/FI2011/050256 which has an International filing date of Mar. 28, 2011, which claims priority to Finnish Application No. 20105308 filed on Mar. 26, 2010. The entire contents of all applications listed above are hereby incorporated by reference.

The present invention relates to a method of treating tall oil pitch, which has sterol alcohols and possibly wood alcohols of fatty acids and resin acids, which alcohols are sourced from tall oil.

In a method such as this, the composition which is treated comprises sterol esters of fatty acids and resin acids, sourced from tall oil, and possibly esters of other wood alcohols.

The present invention also relates to a product which is produced by using such a method, and to its use thereof, especially automotive fuel, such as diesel fuel.

Tall oil is a marginal organic renewable natural product which is obtained as a by-product in the cellulose industry. It is already well-known that tall oil comprises resin acids, fatty acids, sterols and other wood alcohols, and small amounts of inorganic compounds, such as $Na_2SO_4$, which are residues resulting from pulp cooking. Furthermore, tall oil comprises metal cations, sourced from wood and fertilizers, which cations are derived for example from the following elements: Ca, Fe, Mg, P, Al, Zn, Mn, V, As and Si. Tall oil can comprise other inorganic compounds, too. Most commonly, these are in the form of resinates or/and salts of fatty acids. The percentages of them are usually 140-280 ppm. This means that they bind material approximately 6.7 to 7.5 times their own molecular weight. Depending on the concentration, the materials in question bind, for example, resin acids at 900 to 1900 ppm, or at a maximum of 0.2% by weight in crude tall oil and a maximum of approximately 0.6% in the pitch of tall oil refining.

Tall oil pitch, which is a residue resulting from refining by distillation, is generally burnt mixed with the fore-runs of tall oil refining. Tall oil pitch comprises approximately 13% free resin acids, approximately 3 to 8% free fatty acids, approximately only 1% free sterols and approximately 12% bound sterols, and approximately 60% fatty acid esters and fatty acid esters of wood alcohols. In addition, the pitch comprises a small amount of lignin, the molecular weight of which is generally above 1000, and dimers, and oligomers of resin acids.

When the purpose is to utilize pitch to produce automotive fuel from the fatty acids and resin acids which the pitch contains, the metal residues must be discarded. Fuels which comprise metal residues are not suitable for automotive use; also, these residues become catalytic poisons during the process of hydrogenation which is carried out in the production of automotive fuels in order to stabilize the fuel and to prevent it from oxidizing, and to lower the pour point.

According to a solution described in WO Published Patent Application No. 2009131510, removal of these cations is carried out by a treatment using sulphuric acid and phosphoric acid, and a subsequent filtration through a <10 μm filter. According to the patent application, crude tall oil (CTO) is used in the treatment.

However, a treatment according to the known method does not remove zinc, vanadium and arsenic completely. If the removals are carried out by applying each acid treatment separately, in which case the precipitation is almost complete, the process is expensive and complicated. Thus, when CTO is treated, according to the known solution, a large amount of material must be treated. This treatment does not remove lignin, but instead makes it even more soluble.

U.S. Pat. No. 4,426,322 describes a treating of CTO by applying pressurised water, with which water the water-soluble salts, mainly $Na_2SO_4$, are removed, preferably at a temperature of 130° C., from the tall oil before the distillation treatments. However, this treatment does not remove the cations which are bound to the resin acids and the fatty acids, nor the fibres which are in suspension.

According to U.S. Pat. No. 4,248,769, sulphate soap is washed before acidification with a solution of concentrated $Na_2SO_4$, in which case it is possible to remove approximately 50% of the lignin salts, i.e. the lignanes.

US Published Patent Application No. 2009/0217573 A1 describes how fuel for combustion engines is produced from crude tall oil. According to this, the crude tall oil is esterified with alcohol ($C_1$-$C_8$), the water and the alcohol are separated, the remaining dry ester mixture is distilled into two fractions, and the amount of sulphur compounds is decreased by removing them by distillation in different stages.

An article in the magazine *Energy & Fuels* (2001, Vol 15, pp. 1166-1172) describes how a resin acid fraction of crude tall oil is converted into automotive fuel. According to this article, first the —COOH groups are removed by converting them into alcohols or hydrocarbons, by using thermal cleavage, which removes the $CO_2$. For this, a temperature of approximately 400° C. and a Ni-Mo catalyst are needed. According to the same article, it is possible to hydrogenate directly the resin acids at a temperature of 350-400° C. and at a hydrogen pressure of 100 bar, by using a Ni-Mo oxide catalyst on the surface of aluminum oxide. In this way, it is possible to generate cycloalkanes and hydrogenated "aromates".

The experiments in this publication were interesting to the extent that a pure resin fraction was used in them (Unitol NCY/Arizona Chemicals). The boiling point of the main part of the generated product was approximately 320° C. at normal pressure.

U.S. Pat. No. 5,705,722 suggests that tall oil which is essentially free of ash (a distilled product, the bottoms product of which is tall oil pitch), is hydrogenated at a $H_2$ pressure of 4 MPa and a temperature of 370-450° C. The cetane index of a product which is prepared in this way is said to be good enough to be used as an additive in a low quality petrochemical diesel.

The patents described above systematically utilise fractions from which chemicals having high molecular weight have been removed, or, according to some publications, laboratory tests have been carried out using "pure" chemicals. Tall oil, and particularly its pitch, comprises large quantities of cations, which are catalyst poisons. Consequently, methods which are based on hydrogenating pure chemicals are not industrially useful.

It is an aim of the present invention to eliminate at least some of the problems associated with the known technology and to provide a completely new method of treating tall oil pitch, especially treating it in such a way that it is possible to obtain from it automotive fuel or an additive for this fuel.

The present invention is based on the idea that the resin and fatty acids contained in the pitch are first released from their esters. This can be achieved by for instance using water hydrolysis or transesterification or a combination thereof, in which case the transesterification is especially carried out by means of a low-molecular weight alcohol. After that, the fatty acids or lower alkyl esters of them, which are released from a high-molecular weight ester, are removed from the pitch by distillation or preferably evaporation. The steam is condensed and recovered.

It has been found that the evaporation is advantageously carried out by using a device in which the pitch is treated in such a way that it does not essentially boil on the evaporation surface. One preferred embodiment is a short path evaporator, i.e. a device in which the surface to be heated and the cooling surface are close to each other, and in which the gas flow, which is separated from the evaporated liquid, is very slow because of large heating and condensing areas. By using a device such as this, the number of drops and other particles which are carried away with the gas flow is minimal.

It is possible to hydrogenate the products which are prepared in the manner described above, in which case the double bonds of the alkyl esters of fatty acids are hydrogenated, i.e. satisfied, and the —COOH or —COOCH$_3$ groups of fatty acid are converted into carbon dioxide and methane or ethane. The alkyl esters of resin acids are subject to a similar phenomenon, the difference being that their ring structure at least partly opens up. When acting in this way, a biocomponent is generated which is suitable for use as an automotive fuel, for instance diesel fuel.

More specifically, the method according to present invention is mainly characterized by treating tall oil pitch witch has sterol alcohols and possibly wood alcohols of fatty acids and resin acids, witch alcohols are sourced from tail oil.

The product according to the present invention is characterized by a product which is produced by using such a method, and the use thereof, especially automotive fuel, such as diesel fuel.

Considerable advantages are achieved with the present invention. Thus, it is possible to raise considerably the economic value of the components of tall oil pitch as compared with only burning it.

When a main part of the esters of fatty acids and of resin acids, and the free fatty acids and resin acids are released by evaporating them from the pitch, sterols which are also released, and which are even more valuable than the fatty acids, remain in the pitch.

Of the metals which are present in the tall oil, Zn, As, Fe, Si and Pb, and according to some experts also Na and Ca, are harmful catalyst poisons, because they clog the pores of the actual catalyst carrier, such as activated carbon and Al$_2$O$_3$. The first five metals in that list, i.e. Zn, As, Fe, Si and Pb, are hydrogenation catalyst poisons, too. Furthermore, metals, together with, for instance, phosphorus, which are present in car fuels are exhaust gas-converter catalyst poisons, among which lead is the most harmful. In jet engine fuels, the maximum allowed amount of metals all together is 5 to 98 ppb, (0.005 ppm to 0.098 ppm), depending on written sources.

Copper, in turn, is the most harmful metallic impurity in a finished fuel. Already at percentages of 25 µg/l it causes oligomeration of molecules (gum resin).

Consequently, the metals must be carefully removed from fatty acids and resin acids which are generated from tall oil pitch, and in general from fuels which are prepared from tall oil products.

WO/2010/003504 describes a method of adsorbing and absorbing metals from diesel fuel.

This solution relates to removal of Cu, Pb and Zn cations by using fatty acids (R$_2$COOH) which are impregnated onto a carrier powder.

The pure and metal-free fatty acids and resin acids or their alcohol esters, which can be generated with the help of the present invention, are in fact most desired when they are used as fuel for diesel engines. It is possible to hydrogenate the fatty acids, also together with the resin acids, to generate even gas turbine fuel.

In the following, the present invention will be examined more closely with the aid of a detailed description.

The accompanying drawing shows a process flowchart according to one embodiment of the present invention.

In general, the present invention includes the following:
an essential part of the fatty acids and the resin acids are released from their sterol esters and possibly from their other wood alcohol esters,
preferably, they are converted into methanol or ethanol esters or similar lower alkyl esters,
the transesterified products are removed from the pitch by evaporation and then condensed, preferably immediately, and
the condensate obtained is hydrogenated.

Here, "an essential part" means that at least approximately 50% by mole, most suitably at least 70% by mole, especially at least 80% by mole of the sterol and wood alcohols of the fatty acids and resin acids which are contained in the pitch are released from their esters and converted into lower alkyl esters.

Here, "lower alcohol" means $C_{1-4}$ alcohol, preferably methanol or ethanol.

According to the present invention, there are at least two ways to operate (see figure), depending on how the fatty acids and the resin acids are released from the sterol esters and possibly from other wood alcohol esters. It is also possible to combine these two ways.

In the first application, which is labelled "Alt. 1" in the figure, the process starts with a water hydrolysis, which is preferably an acid hydrolysis. In the figure, reference number 1 represents the hydrolysis stage. Soluble salts, and at least part of the cations, which are attached to the resin acids, dissolve in water, which is removed by decantation after the hydrolysis. Reference number 2 represents the drying stage.

Preferably, the hydrolysis is carried out at a temperature of approximately 250-360° C. and, correspondingly, at a pressure of 40-86 bar, and furthermore, the clarification at a temperature of approximately 95° C. It is also possible to operate at a temperature of approximately 220-280° C. and, correspondingly, at a pressure of 25-65 bar.

At this point, the soluble salts and at least some of the salts which are dissolved due to acidity are still in their aqueous phase.

The water hydrolysis described above can be partial or only a water wash. It is important that in as many stages as possible as much of the metals, phosphorus and solids as possible are removed from the fatty acids, resin acids and/or their lower alkyl esters (methyl or ethyl esters), which are separated from the pitch. After any water treatment, the fatty acid mixture which is to be esterified must be carefully dried. If the mixture undergoes no esterification at all, but is distilled apart and hydrogenated after the release, either in the original place of distillation or somewhere else, the disposal of metals is equally important.

A special characteristic of the water hydrolysis is that the dissolved salts are removed along with the excess water, assuming that before evaporation of the water at least a large part of the water is decanted to free it from organic materials. It should be understood that here, water or water vapour hydrolysis means a pretreatment before a possible alcohol esterification.

Instead of the water hydrolysis 1, it is possible to carry out only a water wash, drying and transesterification. In this way, it is possible to remove a major part of the salts ($Na_2SO_4$).

Also, methanol or ethanol can be utilised in a water hydrolysis to help in breaking up the emulsions and to contribute to the transesterification (J. Am. Chem. Soc., 2001, 123(41) pp. 10101-10102).

After that, the transesterification 3 is carried out using a lower alcohol, typically a $C_{1-4}$ alcohol, such as methanol or ethanol, after the reaction mixture has been dried.

According to another preferable embodiment, transesterification which is carried out using the above-mentioned lower alcohol, such as methanol or ethanol, is used directly (this solution is labelled alternative "Alt. 2"). In that case, too, an acidic catalyst is used, which facilitates separation of metals into the generated aqueous phase, which is removed by decantation or centrifugation, or by evaporation.

The pressure and the temperature of the transesterification are chosen depending on how much alcohol is dissolved in the pitch and what the steam pressure of the mixture is. Generally, the pressure is chosen to ensure that alcohol cannot boil away at that chosen temperature. Thus, the temperature is generally within a range of 25-300° C., for instance approximately 50-250° C., and the pressure is normal atmospheric pressure or higher, for instance at maximum 150 bar (abs), most suitably at maximum 100 bar (abs), for instance approximately 2-90 bar (abs).

The transesterification is most suitably carried out using methanol or ethanol, by employing an acidic catalyst, for instance sulphuric acid or an acidic ionic exchange resin.

These transesterifications and the following dryings and evaporations 5 are always carried out one immediately after the other.

In order to maximally utilize the pitch for instance in the production of automotive fuel, the fatty acids which are to be released from the esters are separated by distillation 6.

There are many separation operations. It is possible to carry out the separation for instance with either a fractionating column, which generally comprises some kind of a return, or just by means of "stripping distillation", in which case the column does not comprise a return but it comprises several separation bottoms, or thin film evaporation, or "short path evaporation".

When fatty acids or their esters are evaporated, it is important that they are evaporated without boiling them. For this, it is possible to use a thin film evaporator, but in particular the evaporator used is a "short path evaporator", which comprises a separate drop separator.

In a short path evaporator, the condensation surface and the evaporation surface are in the same space and approximately equal in size. The gases travel a short distance at a low speed. In this way, it is ensured that the metal cations do not migrate from the heating surface to the condensation surface. When pure fatty acid esters are generated in this way, it is easy to carry out a possible hydrogenation treatment of them, because the catalysts are not poisoned by metals.

The use of a short path evaporator is advantageous because, in that case, a minimum amount of metals, if any, move into the distillate or the evaporate. This is important because when the alkyl esters (typically methyl esters) of fatty acids and resin acids, which esters are thus released, are used for production of diesel fuel by hydrogenating, the hydrogenating catalysts are not contaminated. It is possible to feed these esters, together with petrochemical raw materials, directly to further processing at an oil refinery.

In both cases, both the water and the excess alcohol from the transesterification must be first removed by evaporation in a separate unit 4 and not until then are the methyl esters of fatty acids and resin acids separated at a high vacuum from the other constituents of the pitch.

According to a preferred embodiment of the present invention, after the esters of fatty acids and resin acids are removed by evaporation, the sterol compounds are evaporated n by distillation 6 at an essentially lower pressure. Another possible procedure is that after the evaporation of the released acids, the remaining distillation residue of the pitch is dissolved into a lower alcohol, particularly in $C_1$ or $C_2$ alcohol, and the separated alcohol phase is evaporated and the sterols are recovered for further refining.

In both cases the sterols are distilled or evaporated at an even lower pressure than are the fatty acids (T is especially approximately 225° C., p=0.01-3.5 mbar).

The evaporated alkyl ester that is generated is condensed most suitably immediately after the evaporation. Typically, the condensation is carried out within approximately 1-60 minutes, especially within approximately 1-10 minutes following the evaporation.

According to another preferred embodiment, the procedure is that a product in which the fatty acids and resin acids are no longer bound to form high-molecular weight esters, are dried to free them from water (after decantation) and, after that, evaporated, preferably in two stages.

In this case, a composition of fatty acid methyl ester ("Tall Oil Methyl Ester" or "ToMe" and resin acid methyl ester ("Tall Oil Resin Methyl Ester" or "TorMe") is generated in the condensate of the evaporator in the first stage 5, and a sterol composition in the next stage 6. The remainder comprises neutral materials and oligomers which have a high boiling point. The remainder also includes metal resinates.

In the first stage, the operation pressure is approximately 3 to 15 mbar (abs.) and the operation temperature 220° C., and in the second stage—as described above—most suitably the operation temperature is approximately 225° C. and the operation pressure 0.01 to 3.5 mbar (abs).

In this way it is possible to recover approximately 60 to 70% of the constituents of the pitch, free from metal salts.

Even though it is possible to successfully use methyl esters as such as fuel for diesel engines (Bioresource Technology Volume 98, issue 2 Jan. 2007 pp. 241-246), the product is vulnerable to oxidation and oligomerisation.

Consequently, the alkyl ester fraction of fatty acid and resin acid is catalytically hydrogenated and isomerized, if needed, in order to increase the cetane index. By means of hydrogenation, it is possible to decarboxylate the acids and to satisfy the double bonds.

If, in this stage, recovery is desired of the sterol fraction for a final refining, it is separated by evaporation at a lower pressure. Hydrogenation can be carried out in a way which is known per se, for instance as described in the publication *Petroleum and Science and Technology* 16(5&6), 597-609 (1998).

After the evaporation, the remaining pitch ("residual pitch" in the figure), which comprises dimeric resin acids, oligomers, lycopene and alcohols of wood, i.e. lutein and neoxanthine etc, and metal salts of resin acid, is either burnt or used as a raw material for glues.

An article in the magazine *Petroleum and Science and Technology* [16(5&6), 597-609 (1998)] describes how tall oil, from which the pitch is removed (Depitched Tall Oil=DPTO) becomes, by hydrogenation, an excellent improver of the cetane index of diesel oil. The article studied in particular the poisoning of catalysts. It is obvious that the poisoning of catalysts is essentially more probable when operating with pitch than when operating with DPTO, which poisoning is caused by relatively much higher metal percentages.

In the way described above, a composition is obtained, the metal percentages of which are together below 50 mg/litre, and, furthermore, the (Cu+Pb+Zn) percentages are together at maximum 300 µg/litre.

Finally, a few remarks on how the present invention is applied at a tall oil refinery:

In principle, it is possible to use a tall oil refinery for carrying out the reactions and physical separations described above. If short path evaporators are not available, a thin film evaporator-drop separator and distillation column are used, in which already a low reflux ratio separates the splashed metal resinates. However, the advantages of using a short path evaporator are a small drop in pressure and a lower temperature of the evaporation surface.

A normal tall oil distillery having a capacity of for instance 150 000 tonnes/a of fatty acids and resin acids, produces approximately 60 000 tonnes/a of tall oil pitch. When only pitch is now treated at the above-mentioned distillery, and the bottom boilers used are either thin film evaporators or falling film evaporators, and they are operated at an essentially lower capacity, the surface boiling is so insignificant that hardly any unwanted metal compounds travel on to the distillate.

The transmission of material from the heating surface to the condensing surface is almost exclusively confined to evaporation of molecules when a short path evaporator or one of the more ordinary evaporators is used, such as a thin film evaporator and a falling film evaporator, at a capacity which is much lower than the heat transfer capacity they were designed to handle.

According to the first preferred alternative, the evaporation is carried out in a falling film evaporator, at a capacity which is ⅓ to ½ of the original capacity the evaporator was designed to handle.

According to another preferred alternative, the evaporation is carried out in a thin film evaporator, at a capacity which is ⅓ to ½ of the original capacity the evaporator was designed to handle.

The invention claimed is:

1. A method of producing automotive fuel by treating tall oil pitch which comprises sterol esters of both fatty acids and resin acids, and optionally wood alcohol esters of both fatty acids and resin acids, in which the sterol esters are sourced from tall oil,
   wherein
   at least part of the fatty acids and at least part of the resin acids are released from their sterol esters and optionally wood alcohol esters and are converted into lower alkyl esters,
   the lower alkyl esters thus obtained are removed by evaporation from the tall oil pitch and then condensed to produce a condensate, wherein the total metal percentage of the condensate is below 50 mg/liter and,
   the condensate obtained is then hydrogenated to produce said automotive fuel.

2. The method according to claim 1, wherein at least part of the fatty acids and at least part of the resin acids are first released at least partly from said sterol esters and optionally wood alcohol esters by hydrolysis.

3. The method according to claim 1, wherein the at least part of the fatty acids and the at least part of the resin acids are released from said sterol esters and optionally wood alcohol esters by subjecting them to a transesterification reaction with lower alcohols.

4. The method according to claim 1, wherein the tall oil pitch is treated in such a way that it does not boil on an evaporation surface.

5. The method according to claim 2, wherein the hydrolysis is carried out in a short path evaporator.

6. The method according to claim 1, wherein the treatment is carried out in a falling film evaporator, and wherein the volume of the tall oil pitch in the falling film evaporator is from ⅓ to ½ of the total volume of the falling film evaporator.

7. The method according to claim 1, wherein the treatment is carried out in a thin film evaporator, and wherein a volume of the tall oil pitch in the thin film evaporator is from ⅓ to ½ of a total volume of the thin film evaporator.

8. The method according to claim 1, wherein the lower alkyl esters are removed by evaporation at a first pressure and sterol esters are removed by evaporation at a second pressure, wherein the second pressure is lower than the first pressure.

9. The method according to claim 1, wherein the evaporation of the lower alkyl esters produces a distillation residue, and further comprising dissolving the distillation residue into a lower alcohol, in which the dissolving forms a separated alcohol phase, evaporating the separated alcohol phase, and recovering sterols for further processing.

10. The method according to claim 1, wherein the lower alkyl esters are decarboxylated by hydrogenation of the condensate, wherein said hydrogenation decarboxylates the lower alkyl esters and saturates double bonds of the lower alkyl esters.

11. The method according to claim 1, wherein the lower alkyl esters are condensed after the evaporation.

12. The method according to claim 1, wherein at least 50% by mole of both the fatty acids and resin acids are released from their sterol esters and optionally wood alcohol esters and are converted to lower alkyl esters.

13. The method according to claim 1, wherein the at least part of the fatty acids and the at least part of the resin acids are released from said sterol esters and optionally wood alcohol esters by subjecting them to a transesterification reaction with a $C_{1-4}$ alcohol.

14. The method according to claim 1, wherein before the hydrogenation of the condensate (Cu+Pb+Zn) percentages in the condensate are together at maximum 300 µg/liter.

15. The method according to claim 11, wherein said lower alkyl esters are condensed within 1 to 60 minutes after the evaporation.

16. The method according to claim 11, wherein said lower alkyl esters are condensed with 1 to 10 minutes after the evaporation.

17. The method according to claim 13, wherein the $C_{1-4}$ alcohol is selected from methanol or ethanol.

* * * * *